United States Patent [19]

Kincses

[11] Patent Number: 5,265,681
[45] Date of Patent: Nov. 30, 1993

[54] LANDSCAPE LEVELLING AND RAKING APPARATUS

[76] Inventor: Frank Kincses, 3079 Landmark Crescent, Nanaimo, British Columbia, Canada, V9T 5P9

[21] Appl. No.: 954,863

[22] Filed: Sep. 30, 1992

Related U.S. Application Data

[63] Continuation-in-part of Ser. No. 833,321, Feb. 10, 1992.
[51] Int. Cl.⁵ .............................................. A01B 49/02
[52] U.S. Cl. .................... 172/197; 172/199; 172/42; 172/71; 172/118; 172/145; 172/256; 172/348; 172/357
[58] Field of Search ............... 171/197, 21, 42, 43, 171/63, 71, 118, 123, 145, 195, 199, 198, 256, 240, 329, 346, 332, 348, 351, 354, 357, 359, 200

[56] References Cited

U.S. PATENT DOCUMENTS

| | | | |
|---|---|---|---|
| 862,718 | 8/1907 | Davis . | |
| 1,545,564 | 7/1925 | Krotz . | |
| 1,865,812 | 7/1932 | Anderson . | |
| 1,915,844 | 6/1933 | York et al. . | |
| 2,210,233 | 8/1940 | Taylor | 172/138 |
| 2,277,880 | 3/1942 | Noble | 172/198 |
| 2,465,043 | 3/1949 | Schumacher et al. . | |
| 2,918,130 | 12/1959 | Thom | 172/348 |
| 3,011,564 | 12/1961 | Dahlgreen | 172/50 |
| 3,771,608 | 11/1973 | Ancherico . | |
| 4,088,083 | 5/1978 | Dail, Jr. et al. | 172/63 |
| 4,189,008 | 2/1980 | Porter | 172/256 |
| 4,217,962 | 8/1980 | Schaefer . | |
| 4,220,211 | 9/1980 | Hake . | |
| 4,256,182 | 3/1981 | Nething | 172/199 |
| 4,336,760 | 6/1982 | Cohen et al. | 172/21 |
| 4,418,759 | 12/1983 | Mork . | |
| 4,537,262 | 8/1985 | van der Lely . | |
| 4,869,326 | 9/1989 | Hutchins et al. . | |

FOREIGN PATENT DOCUMENTS

| | | | |
|---|---|---|---|
| 1607704 | 11/1990 | U.S.S.R. | 172/351 |
| 1328796 | 9/1973 | United Kingdom | 172/197 |

Primary Examiner—Dennis L. Taylor
Assistant Examiner—Spencer Warnick
Attorney, Agent, or Firm—Barrigar & Oyen

[57] ABSTRACT

A landscape leveling and raking apparatus has a frame, a handle protruding upwardly from the frame, a rake pivotally coupled to the frame to protrude downwardly and rearwardly therefrom, a screed fixed to the frame forwardly of the rake, a plurality of tiller blades rotatably mounted along a forward, open end of the frame, a motor which rotatably drives the tiller blades, and a mechanism for raising or lowering the tiler ,blades relative to the frame. As the blades rotate, they till the soil and propel the apparatus forward. The frame is open along its front edge. This allows soil to accumulate within the frame as the apparatus moves forward. The soil gradually escapes from the frame by passing beneath a screed fixed along the lower rear edge of the frame. The screed levels the soil before it is raked by the tines of the rake.

8 Claims, 6 Drawing Sheets

LANDSCAPE LEVELLING AND RAKING APPARATUS

REFERENCE TO RELATED APPLICATION

This is a continuation-in-part of U.S. application Ser. No. 07/833,321 filed 10 Feb., 1992.

FIELD OF THE INVENTION

This application pertains to an adjustable apparatus for leveling and raking soil in landscaping applications.

BACKGROUND OF THE INVENTION

Landscapers conventionally prepare ground to receive sod or grass seed by grading the ground to obtain a base having the desired slope and/or contours. Screened soil is then spread over the graded base. Labourers then rake the soil by hand to smooth its surface and conform it to the slope and/or contours of the base. Sod or grass seed is then applied to the raked soil.

A significant amount of time is typically required to complete the hand raking operation. The present invention significantly reduces the time required to complete the hand raking operation.

SUMMARY OF THE INVENTION

In accordance with the preferred embodiment, the invention provides a landscape leveling and raking apparatus having a frame, a handle protruding upwardly from the frame, a rake pivotally coupled to the frame to protrude downwardly and rearwardly therefrom, a screed fixed to the frame forwardly of the rake, a plurality of tiller blades rotatably mounted along a forward, open end of the frame, a drive mechanism for rotatably driving the tiller blades, and a mechanism for raising or lowering the tiller blades relative to the frame. A mechanism for adjusting the angle of inclination of the rake relative to the frame is also provided.

The tiller blades are fixed on a rotatable shaft which extends along the forward, open end of the frame. The drive mechanism includes a motor mounted on the frame and a coupling mechanism which drivingly couples the motor to the shaft.

The mechanism for raising or lowering the tiller blades relative to the frame includes first and second link arms which are respectively rotatably mounted on opposed ends of the rotatable shaft and which are pivotally connected to opposed sides of the frame. A second shaft extends parallel to the rotatable shaft. Third and fourth link arms are respectively pivotally connected between opposed ends of the second shaft and the first and second link arms. A lever is pivotally connected to the handle. A height adjusting rod has one end pivotally connected to a fifth link arm fixed to the second shaft and has an opposed end connected to the lever. To adjust the height of the tiller blades, the operator rotates the lever about its pivotal connection to the handle to move the height adjusting rod up or down. If the rod is raised the fifth link arm is lifted. This rotates the second shaft rearwardly, raising the third and fourth link arms, which in turn raise the first and second link arms, thereby raising the shaft which carries the tiller blades. The operator rotates the lever in the opposite direction to lower the tiller blades.

The mechanism for adjusting the angle of inclination of the rake includes a second lever pivotally connected to the handle, and a rake adjusting rod having one end pivotally connected to the rake and an opposed end connected to the second lever. To adjust the angle of the rake the operator rotates the second lever to move the rake adjusting rod up or down. As the rod moves the rake pivots around its connection to the frame.

Advantageously, at least one rotatable wheel is mounted on the frame in a manner allowing the wheel to be pivoted between a storage position in which the wheel remains clear of the ground, and a transport position in which the wheel contacts the ground. The operator places one foot on a brace while the wheel is moved between the storage and a transport positions. A biasing spring assists in moving the wheel into either position and in retaining the wheel in either position.

DETAILED DESCRIPTION OF THE PREFERRED EMBODIMENT

Figure 1:
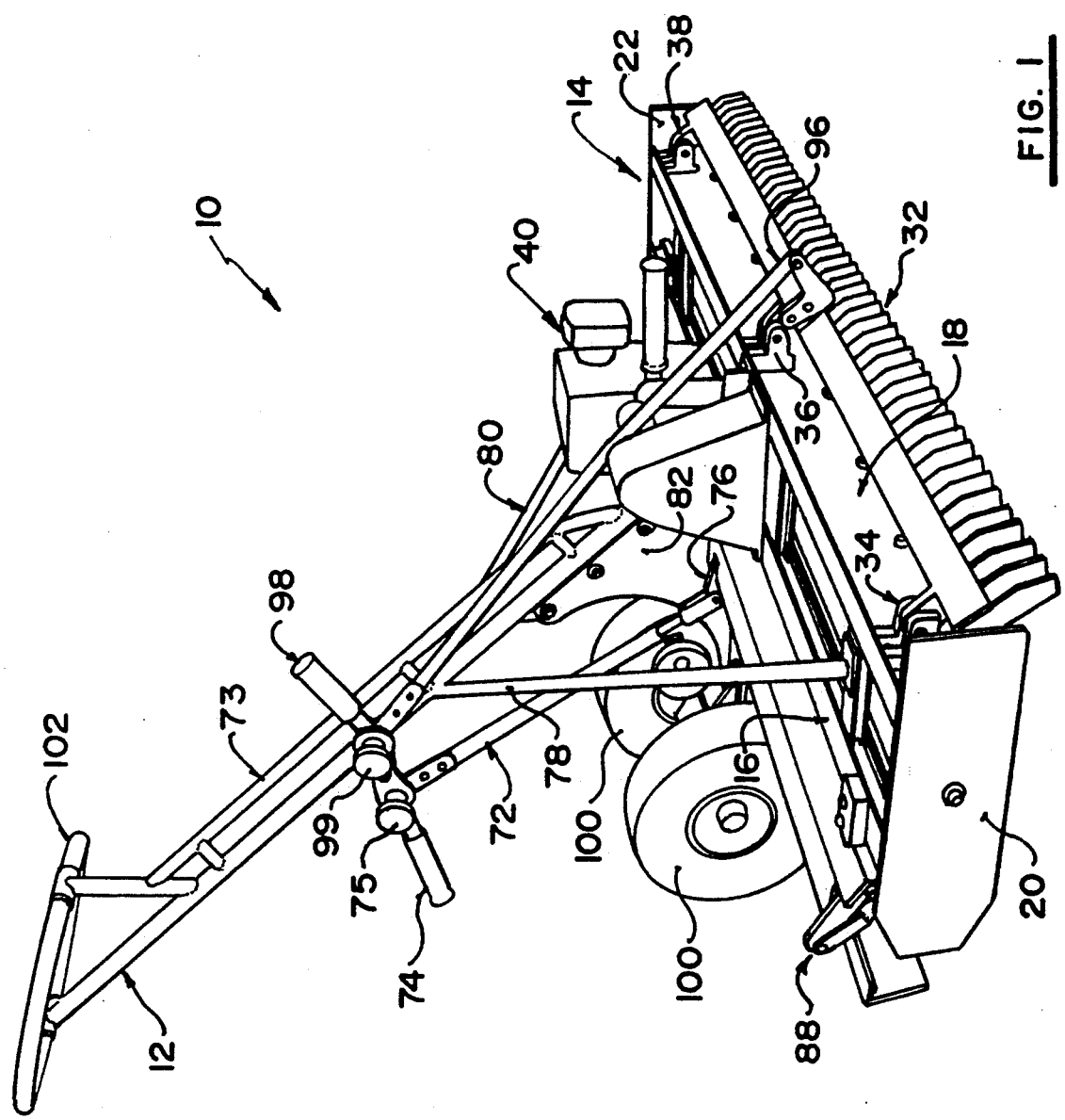
FIG. 1 is an oblique rear perspective view of a landscape leveling and raking apparatus constructed in accordance with the preferred embodiment of the invention.

The drawings depict a landscape leveling and raking apparatus 10 having a handle 12 which projects upwardly and forwardly from a rectangular frame 14 having front, rear, left side and right side walls 16, 18, 20 and 22 respectively which are formed of angle iron, channel members, or other suitable material. Front wall 16 does not project downwardly, as do the other three walls 18, 20 and 22. Frame 14 is accordingly relatively open along its front edge. This allows soil to enter and accumulate within frame 14 as hereinafter explained.

Brace members 24, 26, 28 and 30 extend between front and rear walls 16, 18 to add structural rigidity to frame 14. A multiple-tined rake 32 is pivotally attached by hinges 34, 36 and 38 to rear wall 18, such that rake 32 protrudes downwardly and rearwardly from rear wall 18.

Figure 4:
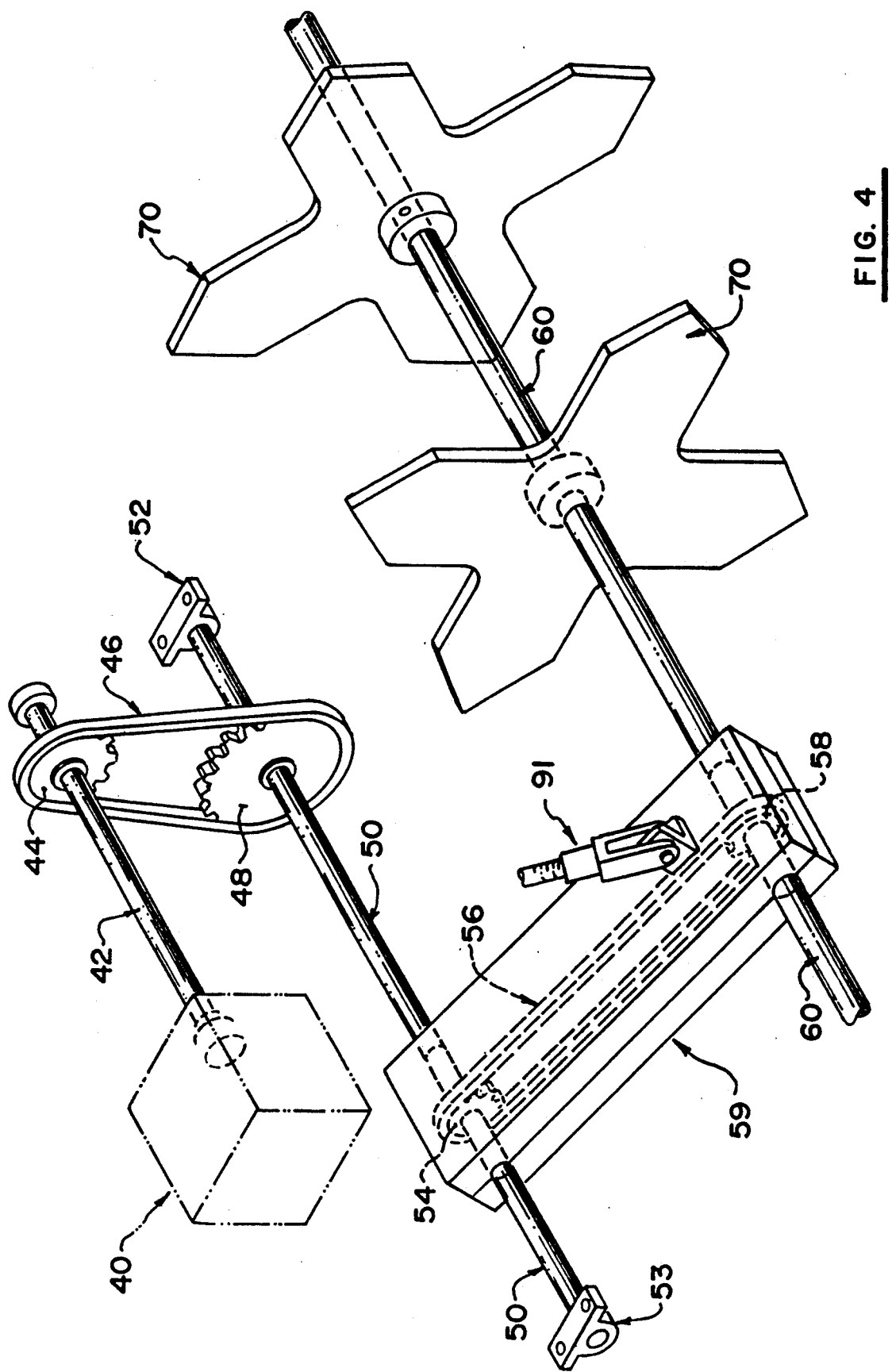
FIG. 4 is an isometric illustration of a portion of the, drive mechanism of the preferred embodiment.
Figure 5:
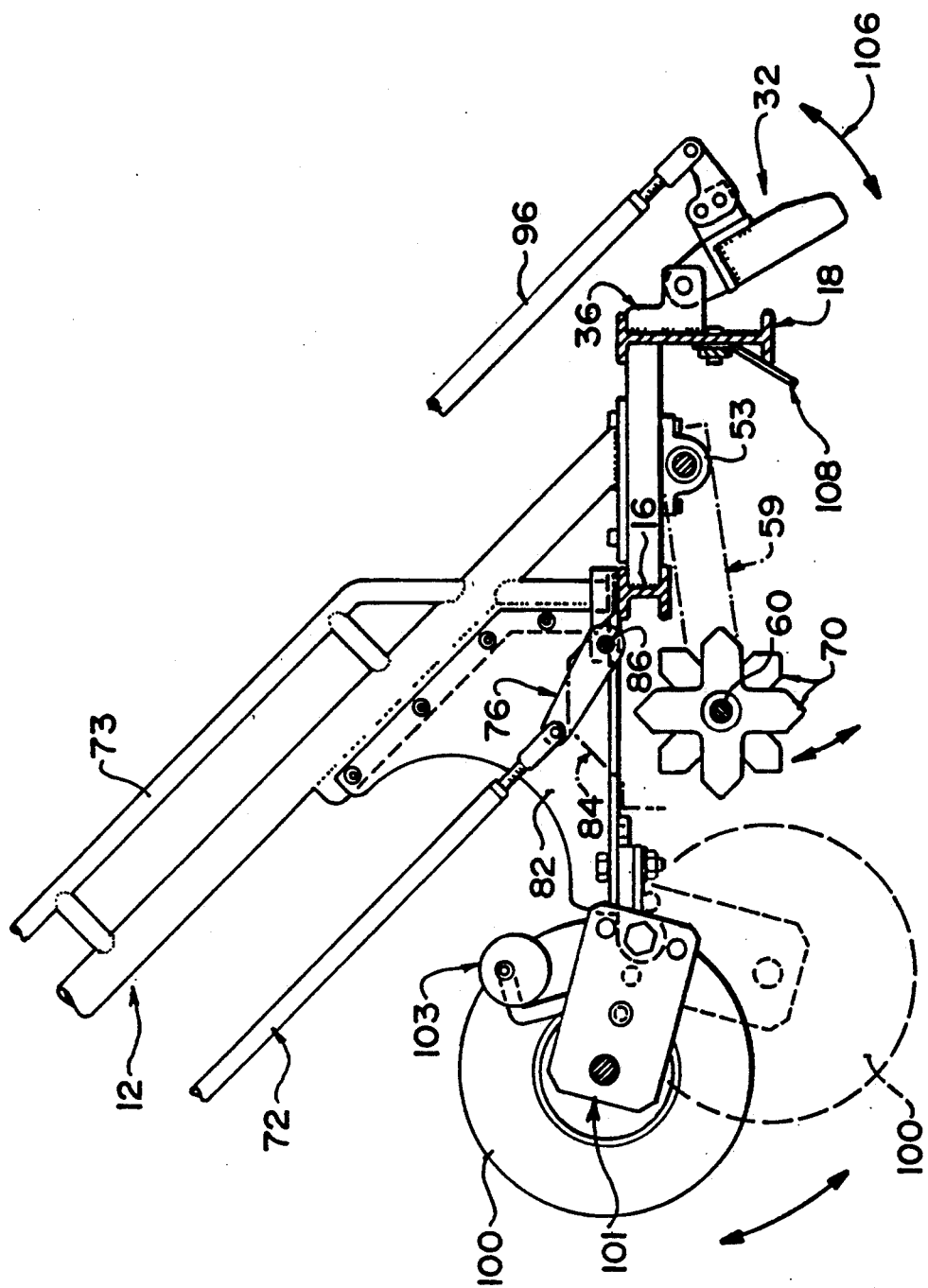
FIG. 5 is cross-sectional view taken with respect to line 5—5 of FIG. 2.

A small, high torque, gasoline-powered motor 40 such as the engine portion of an Echo$^{TM}$ engine drill model ED-2000 (available from Echo Power Equipment of Brampton, Ontario, Canada) is centrally mounted atop frame 14. As best seen in FIG. 4, the drive shaft 42 of motor 40 drivingly rotates first sprocket 44, which drives first chain 46, which in turn drives second sprocket 48 fixed on one end of lower drive shaft 50. Bearings 52, 53 mounted on the undersides of brace members 26, 28 rotatably support the opposite ends of shaft 50. Shaft 50 drives third sprocket 54, which drives second chain 56, which in turn drives fourth sprocket 58 fixed on shaft 60. Sprocket 54, second chain 56 and sprocket 58 are enclosed within impact resistant plastic casing 59 which provides internal bearing support for sprockets 54, 58 and also provides bearing support for the central portion of shaft 60 which passes through casing 59.

Shaft 60 extends along the forward edge of front wall 16 of frame 14. The opposed ends of shaft 60 are fixed to the inner surfaces of link arms 66, 68. Link arms 66, 68 are pivotally connected to the inner forward ends of frame left and right side walls 20, 22 respectively. Casing 59 serves as a third link arm fixed to the central portion of shaft 60. A plurality of multiple-tined tiller blades 70 are fixed on shaft 60 for rotation therewith.

The opposed ends of height adjusting rod 72 are pivotally connected between tiller adjusting lever 74 and link arm 76 respectively. Lever 74 is mounted on handle 12, which is in turn supported by arms 78, 80 which extend between handle 12 and brace members 24, 30; and, by plate 82 which is fixed between the lower end of handle 12 and the top central portion 1 of frame 14. A stiffener rod 73 extends parallel to and is fixed to handle 12 at intervals to assist in resisting forces imposed on handle 12 during operation of apparatus 10. Knob 75 is tightened to fix the position of lever 74 by clamping it between a pair of expandable washers, or loosened to allow adjusting movement of lever 74. Link arm 76 projects through an aperture in top cover plate 84. The opposite end of link arm 76 is fixed to shaft 86, which extends parallel to and above shaft 60 along the underside of cover plate 84. Three link arms 88, 90, 91 are pivotally connected between the ends and central portion of shaft 86 and link arms 66, 68, 59 respectively.

To adjust the height of tiller blades 70, the operator rotates adjusting lever 74 about its pivotal connection to handle 12, thus moving height adjusting rod 72 upwardly or downwardly. Downward rotation of lever 74 raises rod 72, thereby lifting link arm 76 and causing shaft 86 to rotate rearwardly. Such rotation raises link arms 88, 90, 91 which in turn raise link arms 66, 68, 59 thereby raising shaft 60 and tiller blades 70. Upward rotation of lever 74 results in the reverse operation, whereby shaft 60 and tiller blades 70 are lowered. The mechanism should allow the operator to vary the height of tiller blades 70 through a range of about six inches. In general, the harder the soil, the more tiller blades 70 are raised. In very loose soil, tiller blades 70 may be lowered to the maximum extent permitted by the mechanism aforesaid in order to allow blades 70 to till the soil and self-propel apparatus 10. On firmer soil blades 70 are raised to prevent undue interference with the self-propelling action. Apparatus 10 may even be used to spread soil on an existing lawn by raising tiller blades 70 to the maximum extent permitted by the mechanism. This allows the soil to be spread without damaging the lawn.

The opposed ends of a rake adjusting rod 96 are pivotally connected between rake 32 and rake adjusting lever 98 respectively. Lever 98 is mounted on handle 12 opposite tiller adjusting lever 74. Knob 99 is tightened to fix the position of lever 98 by clamping it between a pair of expandable washers, or loosened to allow adjusting movement of lever 99. To adjust the angle of rake 32, the operator rotates adjusting lever 98 about its pivotal connection to handle 12, thus moving rod 96 upwardly or downwardly to change the angle of inclination of rake 32.

Figure 2:
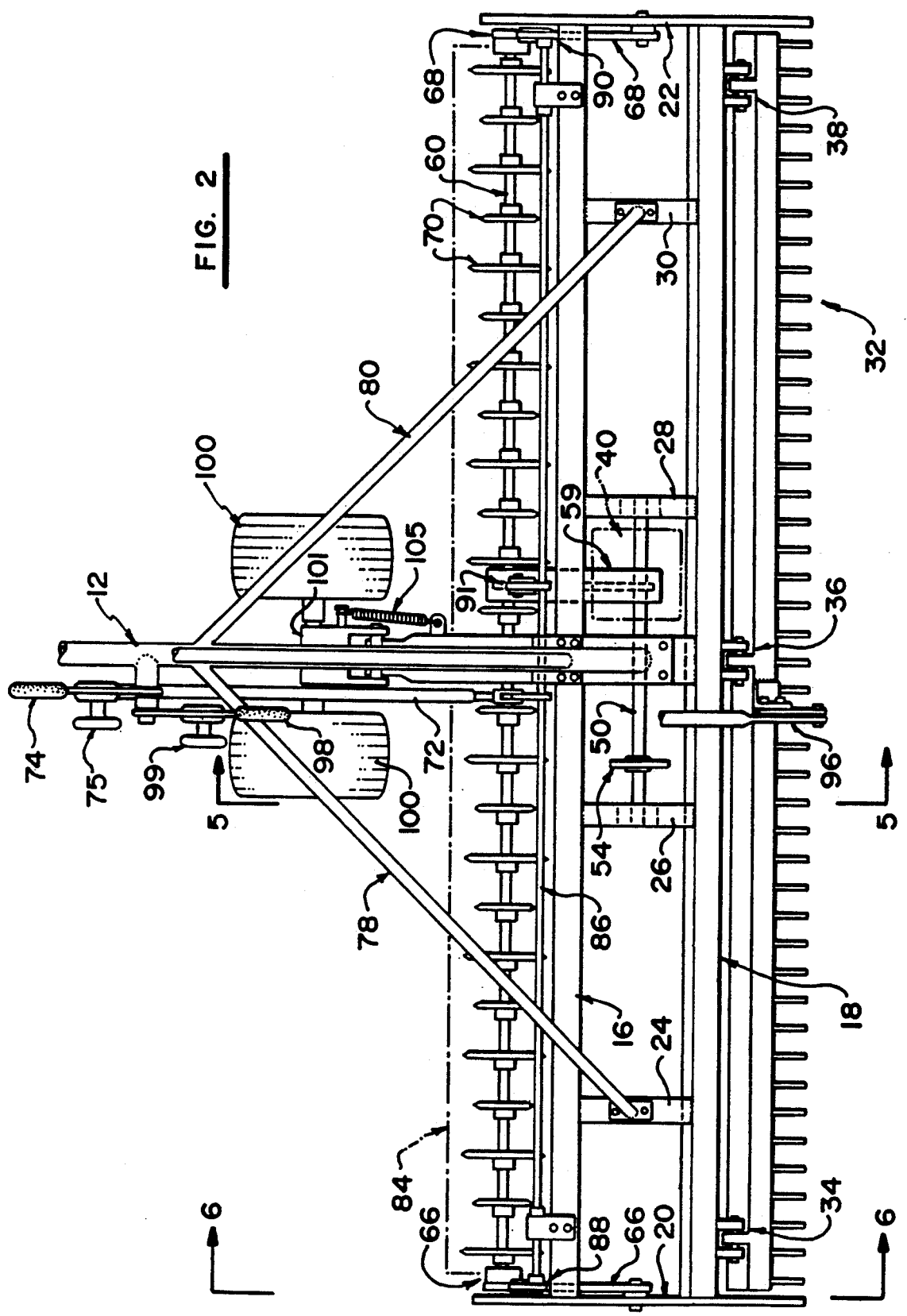
FIG. 2 is a top plan view of the FIG. 1 apparatus.
Figure 3:
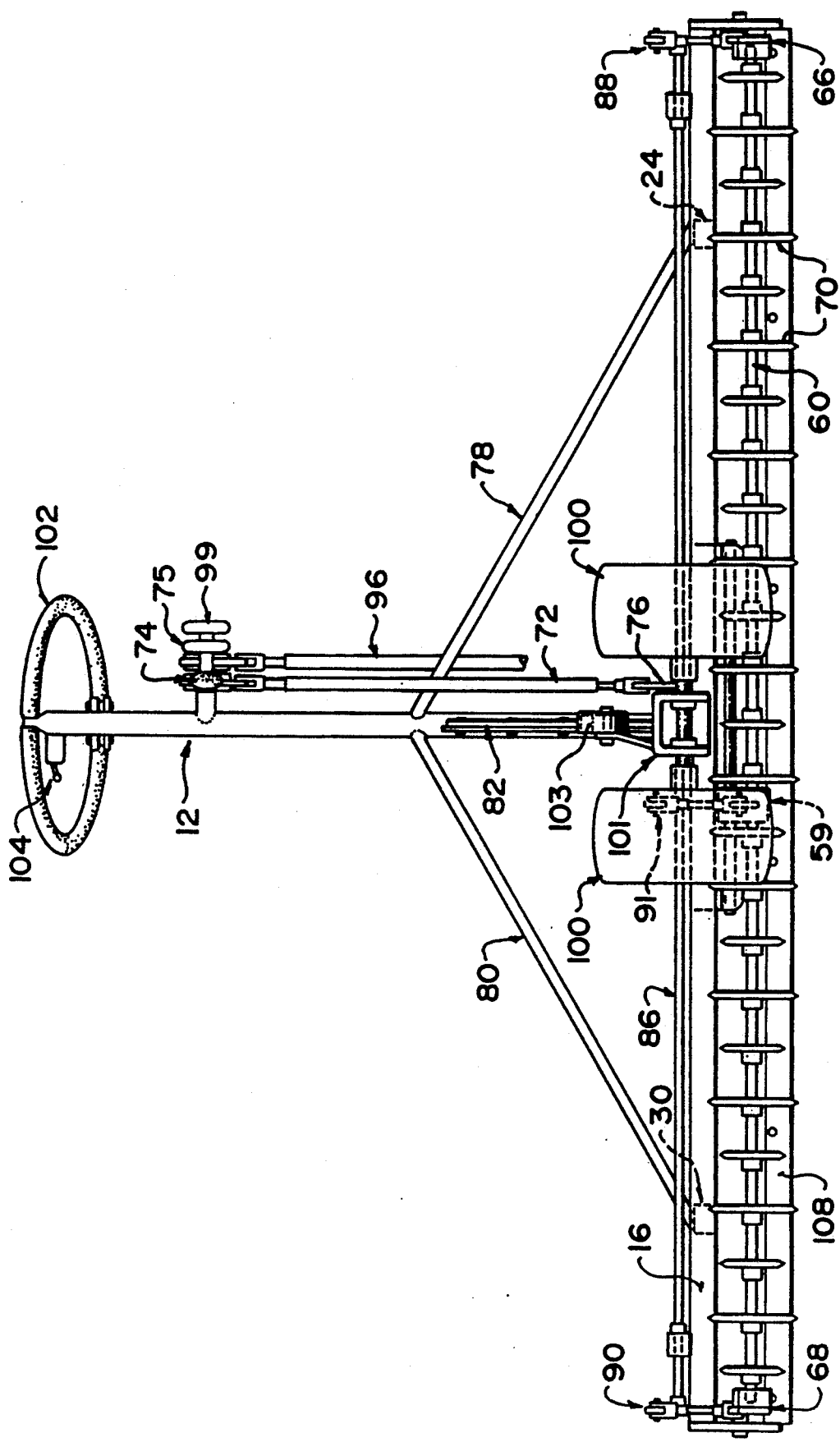
FIG. 3 is a front elevation view of the FIG. 1 apparatus.

Wheels 100 are rotatably coupled to tailpiece 101 which is pivotally connected adjacent both aides of the base of plate 82. This pivotal connection allows wheels 100 to be pivoted between an upper storage position in which wheels 100 remain clear of the ground while apparatus 10 is operated to level and rake soil in landscaping applications; and, a lower transport position in which wheels 100 contact the ground for assisting in movement of apparatus 10 to or from job sites, etc. To move wheels 100 between the two positions the operator braces a foot on tailpiece 101 and hauls back on handle 12 (to pivot wheels 100 into the transport position); or, lifts upwardly with the foot on lever 103 (to place wheels 100 in the storage position). Springs 105 (only one of which is shown in FIG. 2, to avoid obscuring other details of the invention) are provided to assist in moving wheels 100 into the storage or transport positions and retaining them in either position.

In operation, the operator places wheels 100 in the transport position as aforesaid and rolls apparatus 10 on wheels 100 to a job site. Frame 14 is raised clear of the ground when wheels 100 are in the transport position. The operator then starts motor 40 and lowers frame 14 to the ground by placing wheels 100 in the storage position as aforesaid. The preferred motor aforesaid has a centrifugal clutch. At low rpm, the clutch is disengaged, such that blades 70 do not rotate. The operator stands in front of wheels 100, grasps loop portion 102 of handle 12 with one hand and uses the fingers of that hand to operate motor speed control lever 104. Once the speed of motor 40 increases sufficiently, the motor's centrifugal clutch engages and motor 40 drives shaft 60 as aforesaid, thereby rotating tiller blades 70. As blades 70 rotate they propel apparatus 10 forwardly. The operator walks ahead of apparatus 10 and guides it along a desired path.

As previously explained, the open front portion of frame 14 allows soil to enter and accumulate within frame 14 as apparatus 10 moves forward. The soil gradually escapes from frame 14 by passing beneath screed 108, which is fixed along the lower edge of the channel member defining rear wall 18. Screed 108 levels the surface of the soil before it is raked by the tines of rake 32.

Figure 6A:
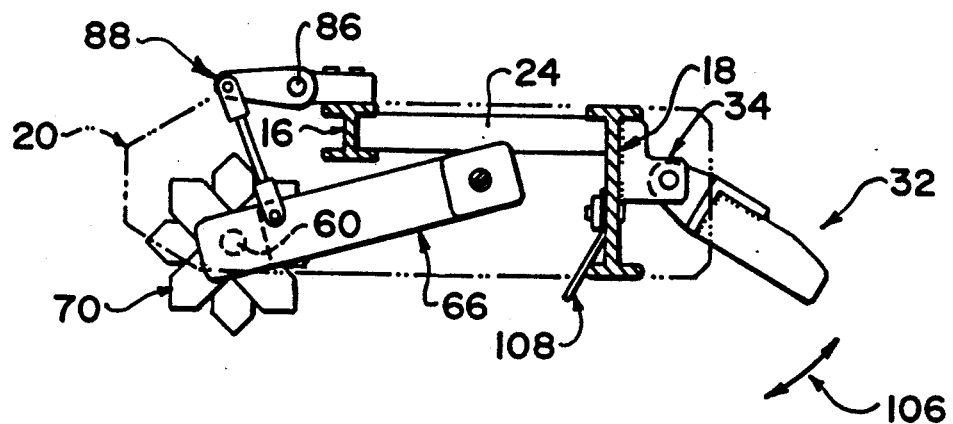
FIG. 6A and 6B are cross-sectional views taken with respect to line 6—6 of FIG. 2 and respectively showing different positions of adjustment of the apparatus.
Figure 6B:
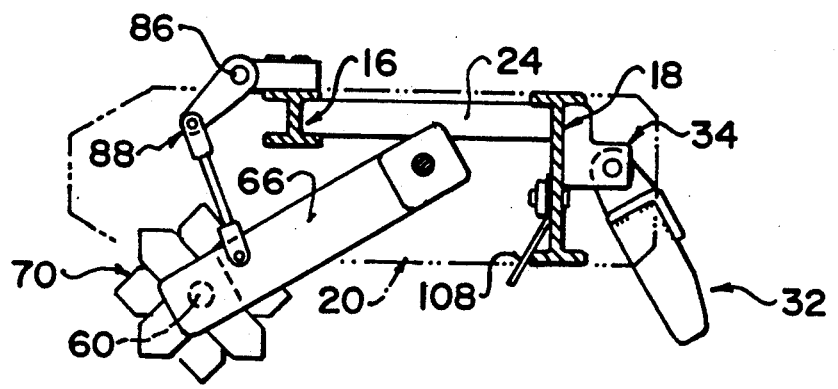

By trial and error, the operator rotates adjusting lever 98 about its pivotal connection to handle 12 to change the angle of inclination of rake 32, thereby changing the depth to which the tines of rake 32 penetrate the soil, as illustrated by arrow 106 (FIG. 6). By raising or lowering rake 32 the operator also causes corresponding raising or lowering of screed 108, thus controlling the amount of soil allowed to escape from frame 35 beneath screed 108. If desired, lever 98 may be initially adjusted so that rake 32 protrudes vertically downwardly, thereby lifting frame 14 clear of the soil. In this position apparatus 10 may be operated such that only the tines of rake 32 contact the soil for initial rough raking thereof; following which lever 98 may be re-adjusted to place rake 32 at an angle, thereby lowering frame 14 into contact with the soil for leveling thereof. A similar trial and error procedure is used with adjusting lever 74 to adjust the height of tiller blades 70.

Once levers 74, 98 have been adjusted as aforesaid, apparatus 10 is guided over screened soil which has been spread upon a graded base. The guided apparatus rakes the soil and conforms it to the slope and/or contours of the base. Sod or grass seed is then applied to the raked soil.

As will be apparent to those skilled in the art in the light of the foregoing disclosure, many alterations and modifications are possible in the practice of this invention without departing from the spirit or scope thereof. For example, a spring-loaded, manually adjustable crank assembly could be provided between frame 14 and tiller blades 70 such that if blades 70 struck a concealed object, the assembly would pivot upwardly, lifting blades 70 clear of the object. After blades 70 passed over the object the spring-loaded assembly would return them to their normal operating depth defined by the manually selected crank setting. Accordingly, the scope of the invention is to be construed in accordance with the substance defined by the following claims.

What is claimed is:

1. Landscape leveling and raking apparatus for finish raking of soil spread on a prepared base, said apparatus comprising:
   (a) a frame having:
      (i) an open forward end;
      (ii) downwardly projecting side walls;
   (b) a forwardly extending handle protruding upwardly from said frame;
   (c) a rake pivotally coupled to said frame to protrude downwardly and rearwardly therefrom;
   (d) a screed fixed to said frame forwardly of said rake;
   (e) a plurality of tiller blades rotatably mounted along said forward, open end of said frame;
   (f) drive means for rotatably driving said tiller blades; and,
   (g) means for raising or lowering said tiller blades relative to said frame.

2. Apparatus as defined in claim 1, further comprising means for adjusting the angle of inclination of said rake relative to said frame.

3. Apparatus as defined in claim 2, wherein:
   (a) said tiller blades are fixed on a rotatable shaft extending along said forward, open end of said frame; and,
   (b) said drive means further comprises a motor mounted on said frame and coupling means for drivingly coupling said motor to said shaft.

4. Apparatus as defined in claim 3, wherein said means for raising or lowering said tiller blades relative to said frame further comprises:
   (a) first and second link arms respectively rotatably mounted on opposed ends of said rotatable shaft and pivotally connected to opposed sides of said frame;
   (b) a second shaft extending parallel to said rotatable shaft;
   (c) third and fourth link arms respectively pivotally connected between opposed ends of said second shaft and said first and second link arms;
   (d) a first lever pivotally connected to said handle; and,
   (e) a height adjusting rod having one end pivotally connected to a fifth link arm fixed to said second shaft and having an opposed end connected to said first lever.

5. Apparatus as defined in claim 4, wherein said means for adjusting said angle of inclination of said rake further comprises a second lever pivotally connected to said handle; and, a rake adjusting rod having one end pivotally connected to said rake and an opposed end connected to said second lever.

6. Apparatus as defined in claim 5, further comprising at least one rotatable wheel mounted on said frame for pivotal movement of said wheel between a storage position in which said wheel remains clear of the ground, and a transport position in which said wheel contacts the ground.

7. Apparatus as defined in claim 6, further comprising brace means for bracing an operator's foot during movement of said wheel between said storage and a transport positions.

8. Apparatus as defined in claim 7, further comprising biasing means for assisting movement of said wheel into said storage position and for retaining said wheel in said storage position.

* * * * *